Dec. 2, 1924.

C. J. FLEENER

JUICE LIMING APPARATUS

Filed June 29, 1923

Inventor
Charles J. Fleener
By O'Neill & Dunn
Attorneys

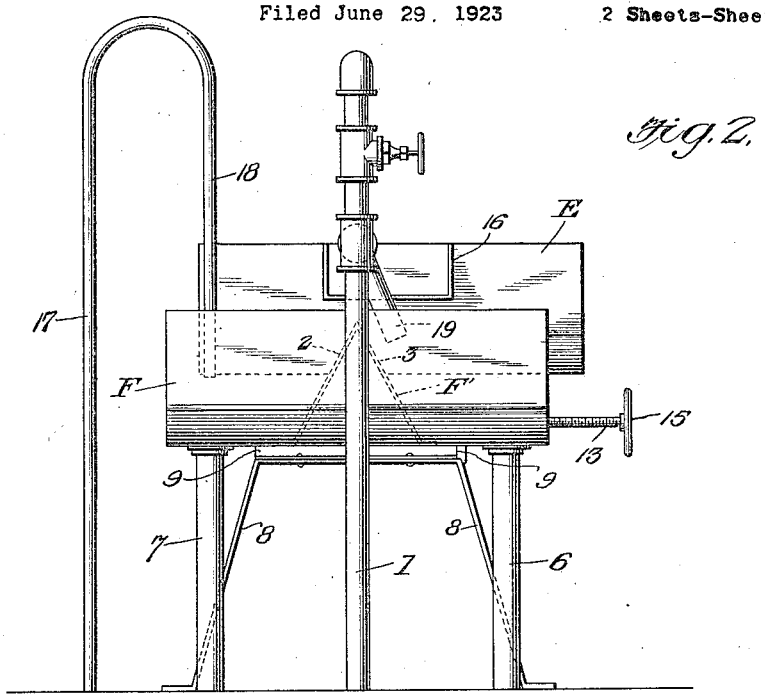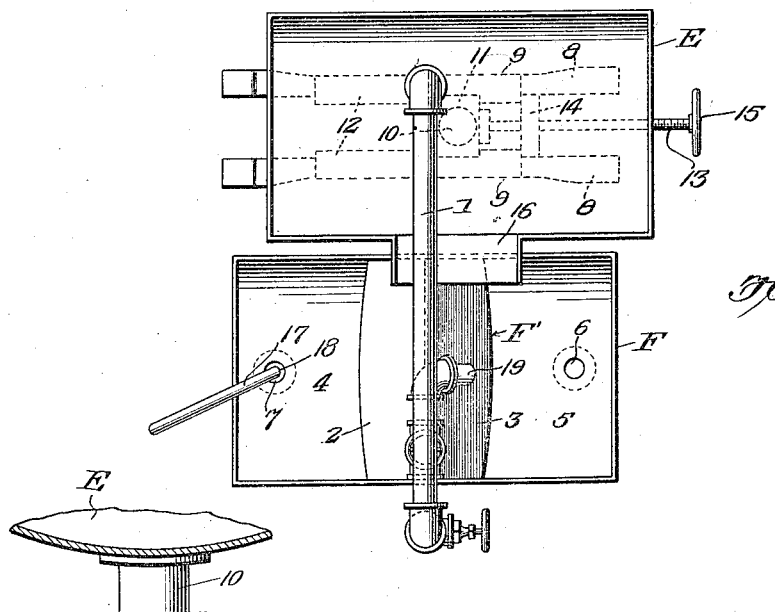

Patented Dec. 2, 1924.

1,517,499

UNITED STATES PATENT OFFICE.

CHARLES J. FLEENER, OF WAIPAHU, TERRITORY OF HAWAII, ASSIGNOR OF ONE-THIRD TO ERNEST W. GREENE AND ONE-THIRD TO W. RICHARDSON, BOTH OF WAIPAHU, OAHU, TERRITORY OF HAWAII.

JUICE-LIMING APPARATUS.

Application filed June 29, 1923. Serial No. 648,542.

*To all whom it may concern:*

Be it known that I, CHARLES J. FLEENER, a citizen of the United States, residing at Waipahu, Territory of Hawaii, have invented certain new and useful Improvements in Juice-Liming Apparatus; and I do hereby declare the following to be a full, clear, and exact description of the invention, such as will enable others skilled in the art to which it appertains to make and use the same.

This invention relates to an apparatus adapted for the treatment of raw juices from sugar cane or the like, and specifically to means whereby a neutralizing agent may be added to such juices while they are in transit.

In the art of sugar making, it is customary to treat raw juices, prior to the heating or boiling process, with sufficient lime to bring the reaction to approximate neutrality, or to any desired point short of or beyond absolute neutrality. Such treatment may, manifestly, be effected at any time after the extraction of the juices, as by adding the neutralizing agent while the juices are in a stationary tank. Lime is the neutralizing agent usually employed in such treatment, and is generally used in the form of milk of lime, since dry lime is very difficult to handle properly, and lime water is insufficiently impregnated.

In the use of milk of lime for the treatment of raw juices, since the lime is merely in suspension, it is difficult to maintain a standard lime treatment, or to add the lime in exact amounts as desired, since the lime in suspension is constantly settling out of suspension unless the milk is maintained in a state of constant agitation. In order to economize in time, and to maintain a necessary agitation, it is very desirable that the milk of lime be added to the raw juice while the latter is in transit from the mill or diffuser, and it is even more necessary that the lime be added to the juices in the proper amounts, as will be readily understood.

The object of this invention is the provision of means adapted for the addition of the milk of lime to the juices while they are in a closed conduit leading directly from the mill, and provided with means whereby the operator may readily ascertain, at any time, as to whether or not the proper amount of lime is being added to the juices.

Another object of the invention is to provide means which are instantly adjustable to automatically add to the juices a greater or less amount of the milk of lime, as necessity requires.

Other objects of the invention will be disclosed in the following specifications, when read in connection with the drawings forming a part thereof.

In said drawings:

Fig. 2 is an enlarged side elevation of the mixing tanks shown at the top of Fig. 1, Fig. 3 is a top plan view of the tanks shown in Fig. 1, Fig. 5 is a detail showing the means for supporting said tank.

Now referring specifically to the drawings, A indicates a closed conduit running from the mill, and adapted to contain the raw juices which are drawn therethrough by means of a suction pump B.

A reservoir C is mounted adjacent the conduit A, and adapted to contain properly purified and standardized milk of lime, and a pump D is positioned near the bottom of the tank C, in communication with the lower portion thereof, and adapted to draw off a constant supply of milk of lime, and deliver it to a pipe 1, leading upwardly alongside of the reservoir C and emptying into a tank E.

Adjacent the tank E, and mounted somewhat below the latter, is a receiver F, provided with a transversely-extending, centrally located partition F′ having downwardly diverging walls 2 and 3, secured to the floor of the receiver F, and forming a triangle having its apex just below the level of the top of the side walls of the receiver. It will be noted, therefore, that the partition F′ serves to divide the receiver F into compartments 4 and 5.

Figure 1:
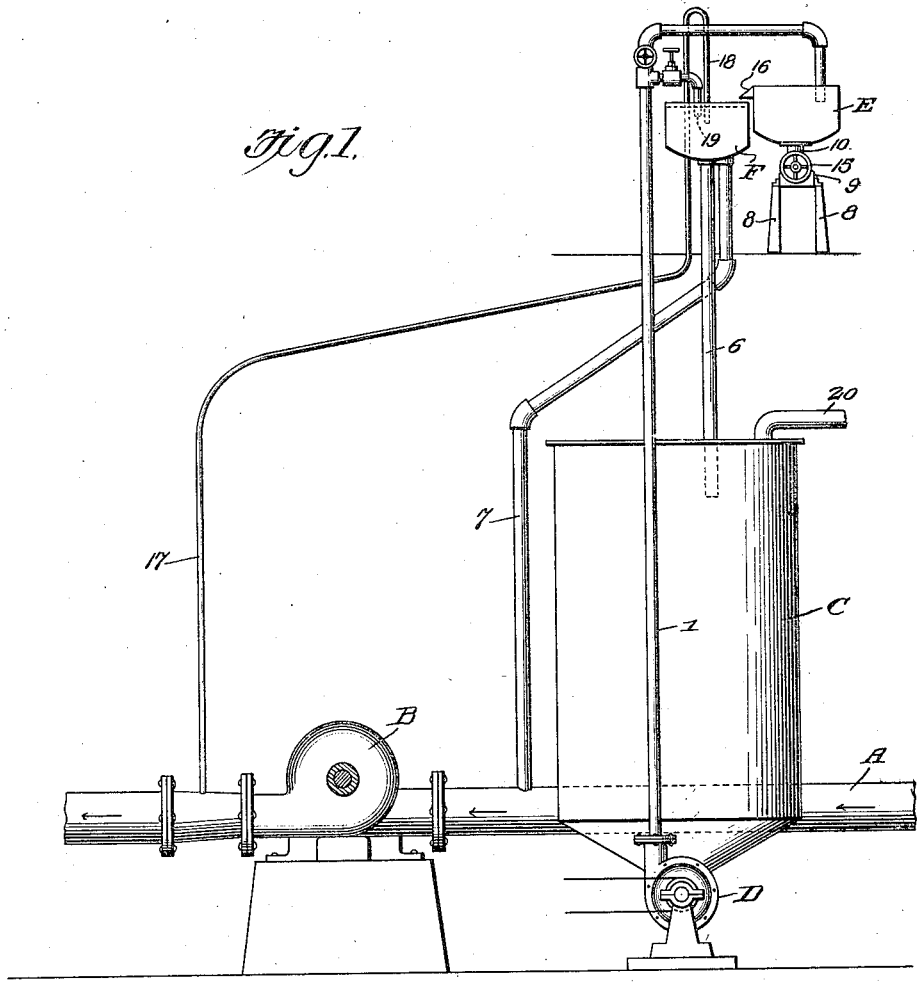
Fig. 1 is a side elevation of my apparatus.

A pipe 6 leads through the bottom of the compartment 5, and empties into the reservoir C, and another pipe 7 leads from the compartment 4, and is tapped into the conduit A carrying the raw juices, as shown in Fig. 1.

Figure 4:
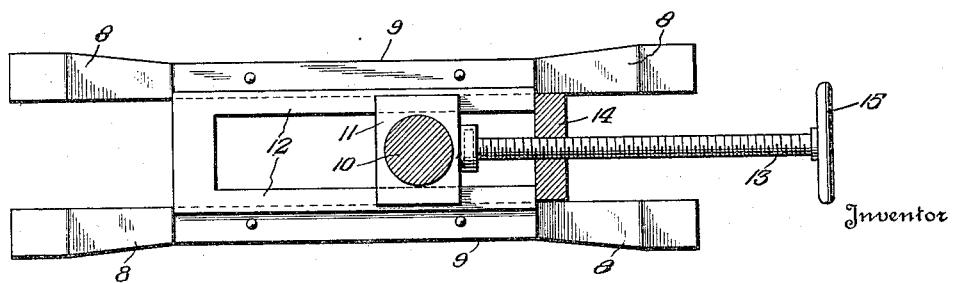
Fig. 4 is a detailed, partly sectioned view of the means for adjusting the position of the lime tank.

The tank E is carried by legs 8, 8, and is slidable upon supporting members 9, 9. A standard 10 is connected to the bottom of the tank, and carries a block 11 provided on each side with longitudinally-extending grooves adapted for the reception of inwardly extending flanges 12, 12, formed on the connections between the members 9, 9 on each side. Secured to the block 11 is an externally screw-threaded shaft 13, which passes through an internally screw-threaded aperture in a casting 14, secured between the legs 8, 8, as shown in Fig. 4. At its outer end the shaft 13 carries a hand wheel 15, whereby the shaft may be rotated to longitudinally move the tank E, as will be understood.

The tank E carries an overflow lip 16, on the side adjacent the receiver F, as shown in Figs. 1, 2 and 3, said lip being somewhat above the top edge of the receiver F, and extending thereover. As shown in Figs. 2 and 3, the lip 16 extends over and projects upon each side of the top or apex of the triangularly formed partition F', and the overflow from said lip will obviously cause some of the milk of lime to enter the compartment 4, and the remainder to fall into the compartment 5, the proportion of such overflow being divided between the compartments in accordance with the position of the tank E, as will be understood.

The milk of lime which has been delivered to the tank E by the pipe 1, under the impulse of pump D, overflows into the compartments 4 and 5, as described, all the milk delivered to the compartment 5 freely running downwardly and back into the reservoir C, through the pipe 6. The milk which passes into the compartment 4, however, passes downwardly through the pipe 7, and enters the conduit A, where it immediately passes with the juices to the pump B, and is there effectually mixed with said juices.

A pipe 17 is tapped into the conduit A, on the pressure side of the pump B, and said pipe leads upwardly and is provided with a downwardly turned outlet 18, emptying into the compartment 4. It is obvious that the pressure of the pump B will serve to maintain a constant stream of mixed juices and milk of lime, passing through said pipe 17 and out of said outlet 18, and, since the juices and milk of lime have been properly mixed in the pump B, immediately prior to egress from the conduit A, the mixture passing through the outlet 18 is representative of the entire mixture which is delivered at the terminal of the conduit A.

The outlet 18 of the pipe 17 is disposed laterally of the partition 2 of the compartment 4, and spaced from the bottom of the compartment, and the steady stream of mixture passing from the outlet is at all times within reach of the operator, who may at any time easily obtain a small quantity thereof and quickly subject it to any desired test, such as tasting or chemical or mechanical treatment, which will indicate whether or not the desired approximation of neutrality has been attained. If the requisite amount of milk of lime is not being added to the juices, through the pipe 7, the operator actuates the wheel 15 to move the tank E to the left, Fig. 3, causing the lip 16 to deliver more of the milk to the compartment 4; if the test shows too great a proportion of milk of lime, the tank E is moved to the right, resulting in a reduced quantity being delivered into the compartment 4, as will be clearly understood.

As before stated, the milk of lime should at all times be kept in a state of agitation, in order to insure the delivery therewith to the raw juices of a proper amount of lime content. It will be noted that the pump D takes the milk from the bottom of the reservoir C, thereby withdrawing the portion of milk with the strongest lime content, and delivering it with some considerable force, under the action of the pump, to the tank E, which force causes a continuous agitation of all the milk in said tank, retaining the lime in suspension. From the compartment 5 of the receiver F, the milk of lime gravitates through the pipe 6 to the reservoir C, assisting agitation therein.

In addition to the herein-described forces for maintaining the desired agitation, I provide a branch pipe 19, leading off from the pipe 1, and terminating in an angularly disposed outlet which discharges into the compartment 5, as illustrated in Fig. 2. The discharge of milk of lime from the pipe 19 materially assists in the maintenance of the necessary agitation of the milk so that the lime will be held in suspension.

From the foregoing the operation of my device should be perfectly clear. The reservoir C, having first been filled with a standard quality of milk of lime, by any means, such as a pipe 20, leading from a source not shown, the pump D is placed in operation and constantly delivers a steady supply of the milk to the tank E and to the compartment 5 of the receiver F, as explained, all unused portions of the milk automatically returning to the reservoir C. By means of the lip or spout 16, a certain proportion of the milk enters the compartment 4 of the receiver F, and passes therefrom through the pipe 7, to the raw juices in the conduit A, and is mixed with said juices by the pump B. The pump B is at all times forcing a small supply of mixed juices and milk of lime through the pipe 17 and delivering it past the outlet 18 to the compartment 4 of the receiver E, all portions of the mixture not used in the test for lime content passing back to the conduit A by means of the pipe 7.

By means of the sliding tank E, as described, the operator may control the position of the overflow lip 16, to accurately deliver the required amount of milk of lime to the compartment 4, and thence to the conduit A, which supply will of course remain constant so long as the pump D is in operation, or until the tank E is again shifted.

From the foregoing it will be obvious that I have provided an apparatus adapted to automatically deliver milk of lime to the raw juices passing along a closed conduit, automatically mix the milk and the juices, and thereafter deliver specimens of said mixture to a point convenient of access to the operator, whereby the necessary tests may be made in determining the amount of lime therein contained. It will also be clear that the apparatus includes means whereby to adjust the amount of milk of lime always being delivered in a steady stream to said juices, and means for maintaining the milk of lime in a constant state of agitation.

Modifications of the structure herein illustrated and described may be suggested to those skilled in the art, but I claim as my invention all such embodiments as fall fairly within the scope of the appended claims.

I claim:

1. An apparatus of the class described comprising, in combination with a conduit for raw juices, a reservoir adapted to contain a neutralizing agent for said juices, a receiver communicating with said conduit, a tank mounted adjacent said receiver and in communication therewith, means for constantly passing a supply of said agent from the reservoir to the tank, and means whereby movement of said tank bodily with respect to said receiver will vary the supply of neutralizing agent passing from the former to the latter, substantially as described.

2. An apparatus of the class described, comprising, in combination with a conduit for raw juice, a reservoir adapted to contain a neutralizing agent for said juices, a receiver provided with a compartment communicating with said conduit, and another compartment communicating with said reservoir, a tank mounted adjacent and overflowing into each compartment of said receiver, and means for shifting said tank to simultaneously vary the amount of agent delivered to each compartment, substantially as described.

3. An apparatus of the class described comprising, in combination with a conduit for raw juices, a reservoir adapted to contain a neutralizing agent for said juices, a receiver, a partition in said receiver dividing the latter into two compartments, one of which communicates with said conduit and the other with said reservoir, a tank located laterally of said receiver and mounted for movement longitudinally thereof, and having an overflow spout overlying each side of said partition, means for delivering a supply of said agent from said reservoir to said tank, and means for moving said tank to vary the supply of said agent delivered on each side of said partition.

4. An apparatus of the class described comprising, in combination with a conduit for raw juices, a reservoir adapted to contain a neutralizing agent for said juices, a receiver in communication with said reservoir and with said conduit, means for delivering a constant supply of said agent to said receiver and means for dividing the agent delivered to said receiver and for causing the desired quantity thereof to be transmitted to said conduit and including means for simultaneously returning the surplus portion of said agent to said reservoir.

5. An apparatus of the class described comprising, in combination with a conduit for raw juices, a reservoir adapted to contain a neutralizing agent for said juices, a receiver in communication with said reservoir and said conduit, and means for delivering a constant supply of said agent to said receiver, for transmission to said conduit and said reservoir, said means being bodily adjustable with respect to said receiver, whereby to vary the quantity of agent delivered by the latter to said conduit, and to said reservoir, substantially as described.

6. An apparatus of the class described comprising, in combination with a conduit for raw juices, a reservoir adapted to contain a neutralizing agent for said juices, a receiver mounted above said reservoir and in communication therewith and with said conduit, means for constantly delivering a supply of said agent to said receiver for transmission to said conduit, and additional means for constantly delivering a supply of said agent from said reservoir to said receiver for subsequent gravitation to said reservoir, whereby to maintain agitation in the latter, substantially as described.

7. An apparatus of the class described, comprising, in combination with a conduit for raw juices, a tank mounted adjacent said receiver and movable longitudinally thereof, means for delivering a neutralizing agent to said tank, a receiver adjacent said tank, and adapted to catch the overflow therefrom, a portion of said receiver communicating with said conduit, and means whereby the movement of said tank longitudinally of the receiver will vary the amount of overflow received by that portion of said receiver in communication with said conduit.

8. An apparatus of the class described, comprising, in combination with a conduit for juices, a receiver, a tank positioned adjacent said receiver and adapted to overflow into the latter, a reservoir for a neutralizing agent for said juices, means for conducting said agent from said reservoir to said tank, a compartment in said receiver in communication with said reservoir and another compartment in said receiver leading to said conduit, and means in the receiver dividing said overflow between the two compartments in said receiver, substantially as described.

9. An apparatus of the class described, comprising, in combination with a conduit for juices, a reservoir for a neutralizing agent for said juices, a receiver provided with a compartment leading to said conduit and another compartment leading to said reservoir, a tank adapted to deliver its overflow into both said compartments, means for conducting said agent from said reservoir to said tank, and means for moving said tank whereby to vary the amount of agent received by each compartment.

10. An apparatus of the class described, comprising, in combination with a conduit for juices, a reservoir for a neutralizing agent for said juices, a receiver provided with a compartment leading to said reservoir, a tank adapted to deliver its overflow into both said compartments, means for conducting said agent from said reservoir to said tank, and means for moving said tank whereby to vary the amount of agent received by each compartment, said means comprising a standard supporting said tank and riding on a track, a screw connected to said standard, and a hand wheel adapted to rotate said screw to move said tank.

In testimony whereof I affix my signature.

CHARLES J. FLEENER.